(12) United States Patent
Zhu et al.

(10) Patent No.: US 11,758,426 B2
(45) Date of Patent: Sep. 12, 2023

(54) ADAPTING SEARCH, MEASUREMENT, AND LOOP TRACKING PERIODICITIES IN NEW RADIO COMMUNICATIONS

(71) Applicant: QUALCOMM Incorporated, San Diego, CA (US)

(72) Inventors: Jun Zhu, San Diego, CA (US); Yongle Wu, San Diego, CA (US); Raghu Narayan Challa, San Diego, CA (US); Linzhe Li, San Diego, CA (US); Jyothi Kiran Vattikonda, San Diego, CA (US); Uzma Khan Qazi, San Diego, CA (US); Thomas James Christol, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/348,635

(22) Filed: Jun. 15, 2021

(65) Prior Publication Data
US 2022/0070707 A1 Mar. 3, 2022

Related U.S. Application Data

(60) Provisional application No. 63/073,325, filed on Sep. 1, 2020.

(51) Int. Cl.
*H04B 7/0408* (2017.01)
*H04B 7/12* (2006.01)
(Continued)

(52) U.S. Cl.
CPC .......... *H04W 24/10* (2013.01); *H04B 7/0408* (2013.01); *H04B 7/12* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2009/0135803 A1* 5/2009 Luo .................. H04L 5/0051
2021/0068193 A1* 3/2021 Kong ................ H04W 24/10
(Continued)

*Primary Examiner* — Timothy J Weidner
(74) *Attorney, Agent, or Firm* — Patterson & Sheridan, LLP

(57) ABSTRACT

Certain aspects of the present disclosure provide techniques for adapting search, measurement, and loop tracking periodicities in new radio communications. A method that may be performed by a user equipment (UE) includes determining, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell. The method may further includes performing the search at the determined first periodicity, measurement at the determined second periodicity, and loop tracking at the determined third periodicity.

50 Claims, 14 Drawing Sheets

(51) Int. Cl.
| | |
|---|---|
| H04B 17/309 | (2015.01) |
| H04B 17/382 | (2015.01) |
| H04J 11/00 | (2006.01) |
| H04L 1/20 | (2006.01) |
| H04L 5/00 | (2006.01) |
| H04W 24/08 | (2009.01) |
| H04W 24/10 | (2009.01) |
| H04W 36/32 | (2009.01) |
| H04W 36/36 | (2009.01) |
| H04W 52/22 | (2009.01) |
| H04W 52/52 | (2009.01) |
| H04W 56/00 | (2009.01) |
| H04W 84/02 | (2009.01) |
| H04W 88/06 | (2009.01) |
| H04W 88/10 | (2009.01) |
| H04W 92/02 | (2009.01) |
| H04W 92/10 | (2009.01) |

(52) U.S. Cl.
CPC ......... *H04B 17/309* (2015.01); *H04B 17/382* (2015.01); *H04J 11/0069* (2013.01); *H04J 11/0093* (2013.01); *H04L 1/203* (2013.01); *H04L 5/001* (2013.01); *H04W 24/08* (2013.01); *H04W 36/32* (2013.01); *H04W 36/36* (2013.01); *H04W 52/22* (2013.01); *H04W 52/52* (2013.01); *H04W 56/003* (2013.01); *H04W 56/0015* (2013.01); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC ........ H04J 2011/0003–0096; H04L 1/20–208; H04L 5/0001–0098; H04W 4/02–029; H04W 8/22–245; H04W 24/02–10; H04W 28/02–26; H04W 36/0005–385; H04W 48/02–20; H04W 52/02–60; H04W 56/0005–0095; H04W 72/005–14; H04W 74/002–0891; H04W 76/10–50; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2022/0104147 A1* | 3/2022 | Cui | H04L 5/0048 |
| 2022/0322122 A1* | 10/2022 | Fujimura | H04W 24/10 |

* cited by examiner

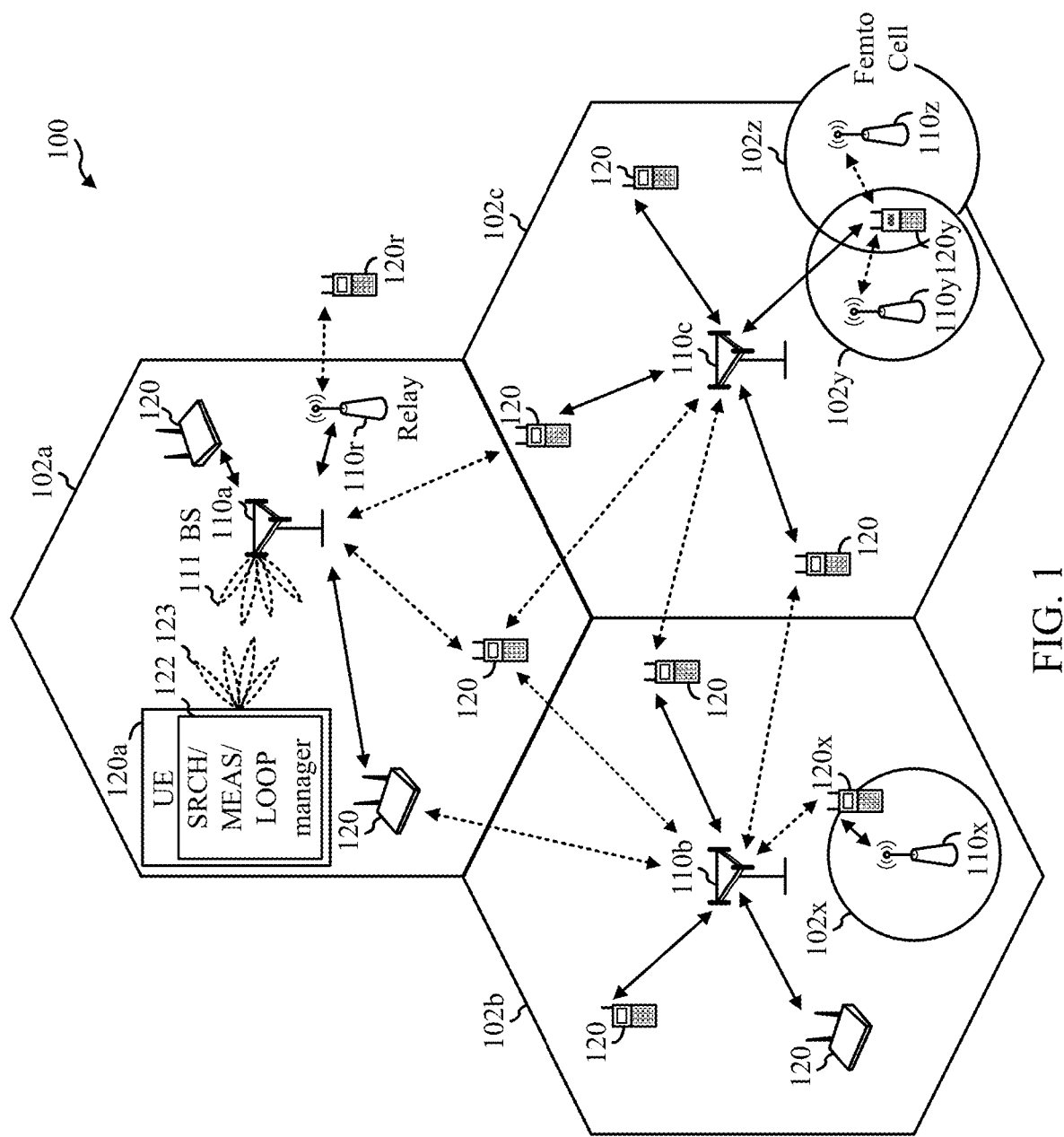
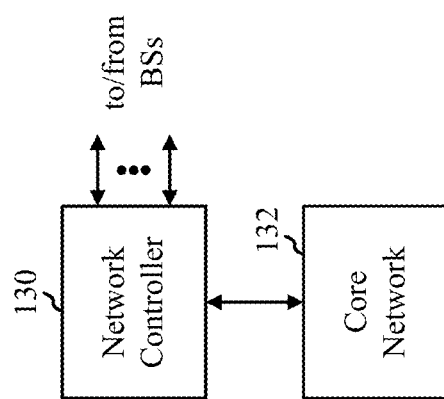
FIG. 1

900

| Operating configuration | Search periodicities for modes (i.e., a UE performs a search per the indicated number of SSB measurement timing configuration (SMTC) windows or CDRX cycles) | | |
|---|---|---|---|
| | Excellent or Normal mode | Intermediate search mode | Intensive search mode |
| Without CDRX | 8 SMTC windows | 4 SMTC windows | 2 SMTC windows |
| With CDRX | 8 CDRX cycles | 4 CDRX cycles | 1 CDRX cycle |

| Operating configuration | Measurement periodicities for modes (i.e., a UE performs a measurement per the indicated number of SMTC windows or CDRX cycles) | | | |
|---|---|---|---|---|
| | Excellent or Normal mode | First intermediate measurement mode | Second intermediate measurement mode | Intensive measurement mode |
| Without CDRX | 8 SMTC windows | 4 SMTC windows | 2 SMTC windows | 1 SMTC window |
| With CDRX | 8 CDRX cycles | 4 CDRX cycles | 2 CDRX cycles | 1 CDRX cycle |

| Operating configuration | Loop periodicities for modes (i.e., a UE performs loop tracking per the indicated number of SMTC windows or CDRX cycles) | | | |
|---|---|---|---|---|
| | Excellent or Normal mode | First intermediate loop tracking mode | Second intermediate loop tracking mode | Intensive loop tracking mode |
| Without CDRX | 8 SMTC windows | 4 SMTC windows | 2 SMTC windows | 1 SMTC window |
| With CDRX | 8 CDRX cycles | 4 CDRX cycles | 2 CDRX cycles | 1 CDRX cycle |

FIG. 11

ADAPTING SEARCH, MEASUREMENT, AND LOOP TRACKING PERIODICITIES IN NEW RADIO COMMUNICATIONS

CROSS-REFERENCE TO RELATED APPLICATION(S)

This application claims benefit of and priority to U.S. Provisional Patent Application No. 63/073,325, filed Sep. 1, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for adaptively adjusting the periodicities for searching, measuring, and loop tracking in new radio (NR) communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After reading the section entitled "Detailed Description" one will understand how the features of this disclosure provide advantages that include improved searching, measuring, and loop tracking in wireless communications scale scheduling periodicities of search, measurement, and loop, leading to improved mobility performance and reduced power consumption.

Certain aspects of the subject matter described in this disclosure can be implemented in a method for wireless communication by a user equipment (UE). The method generally includes determining, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell. The method further includes performing the search at the determined first periodicity, measurement at the determined second periodicity, and loop tracking at the determined third periodicity.

Certain aspects of the subject matter described in this disclosure can be implemented in an apparatus for wireless communications. The apparatus includes at least one processor and a memory configured to determine, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell. The at least one processor and memory are further configured to perform the search at the determined first periodicity, measurement at the determined second periodicity, and loop tracking at the determined third periodicity.

Certain aspects of the subject matter described in this disclosure can be implemented in an apparatus for wireless communications. The apparatus includes means for determining, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell. The apparatus further includes means for performing the search at the determined first periodicity, measurement at the determined second periodicity, and loop tracking at the determined third periodicity.

Certain aspects of the subject matter described in this disclosure can be implemented in a non-transitory computer readable medium. The non-transitory computer readable medium stores instructions that, when executed by a computing device, cause the computing device to determine, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell. The non-transitory computer readable medium stores instructions that, when executed by the computing device, further cause the computing device to perform the search at the determined first periodicity, measurement at the determined second periodicity, and loop tracking at the determined third periodicity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings.

FIG. 1 is a block diagram conceptually illustrating an example wireless communication network, in accordance with certain aspects of the present disclosure.

FIGS. 9-11 illustrate example periodicities of search, measurement, and loop tracking in different operating configurations, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
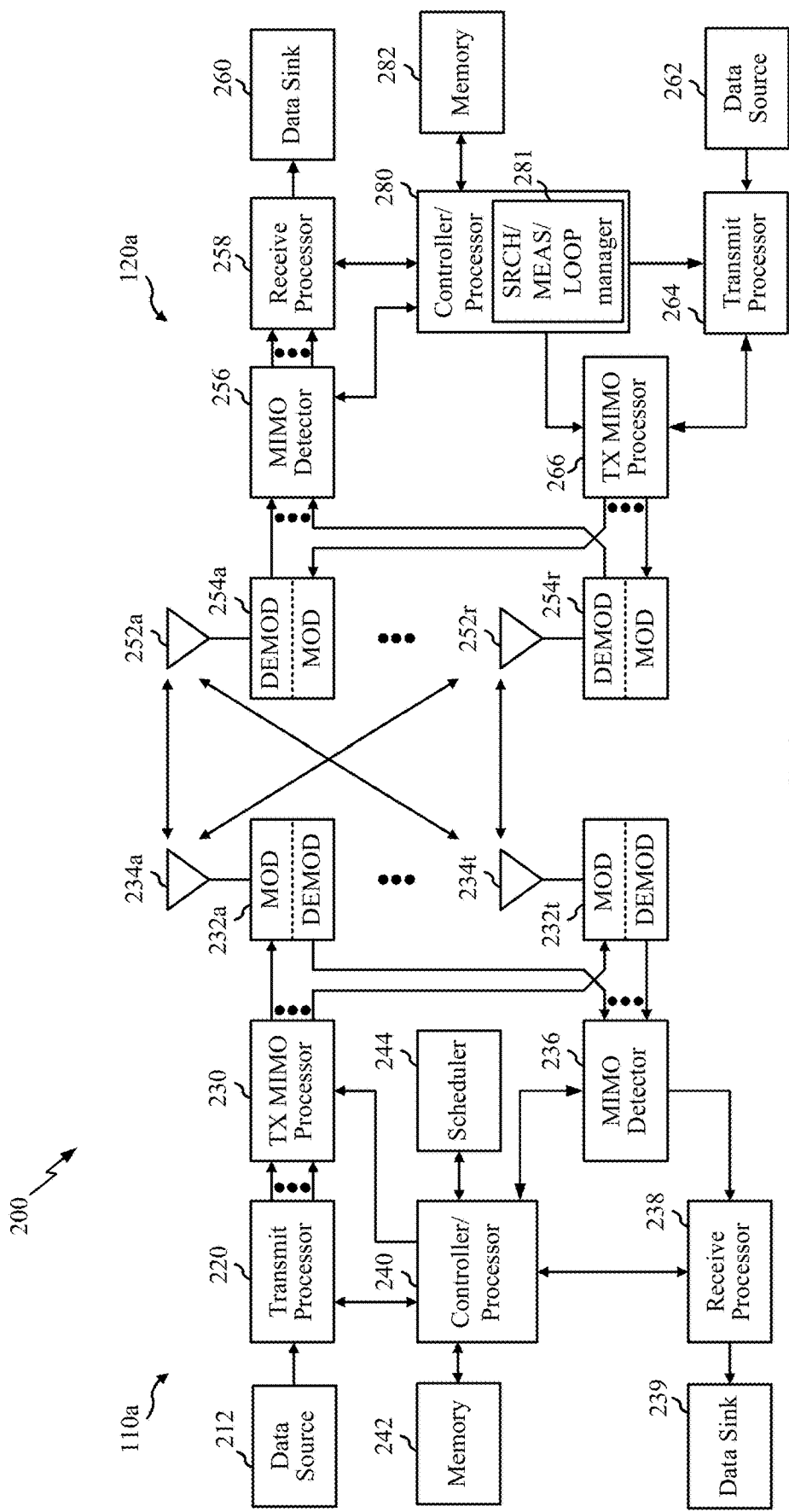
FIG. 2 is a block diagram conceptually illustrating a design of an example a base station (BS) and user equipment (UE), in accordance with certain aspects of the present disclosure.

Aspects of the present disclosure provide apparatus, methods, processing systems, and computer-readable mediums for adaptively adjusting periodicities for performing search, measurement, loop tracking, and sleep by user equipments (UEs).

Performing a search by a UE includes detecting new cells (e.g., neighboring or potentially neighboring cells), component carriers, and/or beams. Performing measurement by a UE includes measuring beams in one or more detected cells and/or measuring one or more cells on more detected CCs. Scheduling search, measurement, and loop tracking may be challenging. Search and measurement scheduling in new radio (e.g., 5G NR), for both millimeter-Wave (mmW) and sub-6 GHz (Sub6) frequency bands, is more demanding than in LTE communications. In 5G NR communications, there are many dimensions to cover. For example, the UE measures cells, CCs, next generation Node B (gNB) beams, and UE beams. In mmW communications, the beam dynamics may be faster than cell dynamics. For example, a UE can rotate (e.g., change orientation) quickly even without moving (e.g., translating to a different location). In addition, there may be fewer resources available in NR than in LTE systems. For example, reference signals (RS) are not always present in 5G NR communications.

According to aspects of the present disclosure, search, measurement, loop tracking, and sleep periodicities can be adaptively determined. For example, based on one or more conditions or parameters, the periodicities can be optimized for performing search, measurement, loop tracking, and/or sleep. In aspects of the present disclosure, a UE determining whether to perform search, measurement, loop tracking, or sleep may make tradeoffs between performance of the UE and power consumption by the UE.

A smart periodicity scaling framework is desirable in 5G NR communications to improve both performance and power consumption. For example, setting the periodicity for search too low may cause the UE to consume power at high rates because searching causes a UE to process all four symbols in each configured synchronization symbol block (SSB), while setting the search periodicity too high may cause the UE to fail to find new component carriers (CC) or cells, possibly causing a radio link failure (RLF) at the UE. Setting the search periodicity too low may also reduce opportunities for loop tracking (e.g., due to a limited number of RS opportunities) and cause the UE to fail to converge in tracking a serving beam. In another example, setting the measurement periodicity too low may cause the UE to consume excess power in measuring (as compared to the UE sleeping during some SSBs and not performing measurement or processing), while setting the measurement periodicity too high may cause the UE to fail to track good candidate cells and/or beams while the UE is moving. In addition, setting the measurement periodicity too low may also reduce opportunities for loop tracking and cause the UE to fail to converge in tracking a serving beam. In still another example, setting the loop tracking periodicity too low may cause the UE to consume excess power in loop tracking (e.g., as compared to the UE sleeping), while setting the loop tracking periodicity too high may cause a UE to have large frequency tracking loop (FTL) or timing tracking loop (TTL) drift, which can make search and measurement by the UE unreliable. Also, setting the frequency tracking periodicity too low reduces the UE's chance to discover and/or track candidate cells and/or beams.

The following description provides examples of adaptively adjusting the periodicities of search, measurement, loop tracking, and sleep by UEs in communication systems Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, wireless communication network 100 may be in communication with a core network 132. Core network 132 may be in communication with one or more base station (BSs) 110a-z (each also individually referred to herein as BS 110 or collectively as BSs 110) and/or user equipment (UE) a-y (each also individually referred to herein as UE 120 or collectively as UEs 120) in wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for macro cells 102a, 102b and 102c, respectively. The BS 110x may be a pico BS for a pico cell 102x. BSs 110y and 110z may be femto BSs for femto cells 102y and 102z, respectively. A BS may support one or multiple cells.

BSs 110 communicate with UEs 120 in the wireless communication network 100. UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., BS 110a or UE 120r) and sends a transmission of the data and/or other information to a downstream station (e.g., a UE 120 or a BS 110), or that relays transmissions between UEs 120, to facilitate communication between devices.

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, BS 110a may utilize beamforming with the UE 120a to improve path loss and range. To do so, BS 110a and the UE 120a may each include a plurality of antennas, such as antenna elements, antenna panels, and/or antenna arrays to facilitate the beamforming.

In some cases, BS 110a may transmit a beamformed signal to UE 120a in one or more transmit directions 111. UE 120a may receive the beamformed signal from the BS 110a in one or more receive directions 123. UE 120a may also transmit a beamformed signal to the BS 110a in one or more transmit directions. BS 11a may receive the beamformed signal from UE 120a in one or more receive directions. BS 110a and UE 120a may then perform beam training to determine the best receive and transmit directions for each of BS 110a and UE 120a. Notably, the transmit and receive directions for BS 110a may or may not be the same. Similarly, the transmit and receive directions for UE 120a may or may not be the same.

According to certain aspects, the BSs 110 and UEs 120 may be configured for adaptively adjusting the periodicities of search, measurement, loop tracking, and sleep by UEs. As shown in FIG. 1, the UE 120a includes a search/measurement/loop tracking manager 122 that determines how often to perform search, measurement, and loop tracking and performs at least one of search, measurement, or loop tracking according to the determination.

A network controller 130 may be in communication with a set of BSs 110 and provide coordination and control for these BSs 110 (e.g., via a backhaul). In aspects, network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

FIG. 2 illustrates example components of BS 110a and UE 120a (e.g., wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceiver(s) 232a-232t. Each modulator in transceiver(s) 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceiver(s) 232a-232t may be transmitted via the antennas 234a-234t, respectively.

At UE 120a, the antennas 252a-252r may receive the downlink signals from BS 110a and provide received signals to the demodulators (DEMODs) in transceivers 254a-254r, respectively. Each demodulator in transceiver(s) 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceiver(s) 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110a. At BS 110a, the uplink signals from UE 120a may be received by antennas 234, processed by the modulators in transceiver(s) 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of BS 110a may be used to perform the various techniques and methods described herein. For example, as shown in FIG. 2, controller/processor 280 of UE 120a has a search/measurement/loop tracking manager 281 that determines how often to perform search, measurement, and loop tracking based on one or more parameters, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
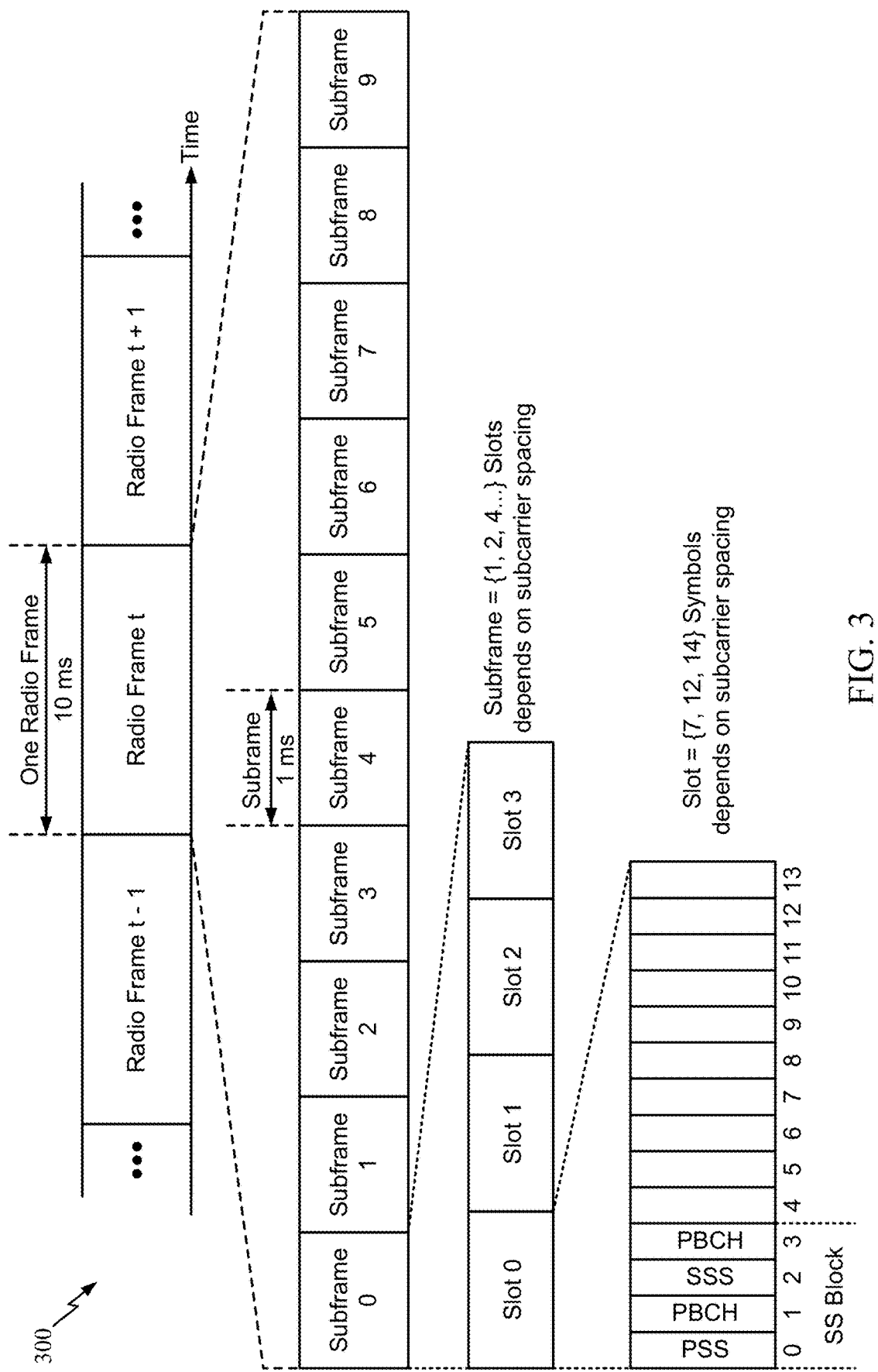
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Search, measurement, and/or loop tracking may be based on measurements of a reference signal in an RS occasion. In some examples, the search, measurement, and/or loop tracking may be based on SSB. For example, for search, a UE can measure SSBs to detect a serving cell, one or more neighboring cells, and/or one or more potentially neighboring cells. The search can be done for different cells, different component carriers, and/or using different transmit and/or receive beams. For measurement, a UE can measure SSBs to track cells in detected CCs and/or to track beams in detected cells. For loop tracking, SSBs can be used for radio link failure (RLF), beam failure detection (BFD), beam failure recovery (BFR), and/or path loss tracking to maintain an FTL, TTL, or AGC loop and/or for uplink and/or downlink serving beam quality tracking. Other types of RSs can be used for the search, measurement, and/or loop tracking, such as a CSI-RS or a tracking reference signal.

An RS occasion that is configured by a network may be an (SSBS), an SSB measurement timing configuration (SMTC) window, or a connected mode discontinuous reception (CDRX) cycle. For example, a UE may perform search with a first periodicity X, meaning every X SSBSs the UE performs search. Similarly, the UE may perform measurement with a second periodicity Y, and perform loop tracking with a third periodicity Z. In some RS occasions, the UE may sleep (e.g., skip processing of the RS) for power and/or processing saving by the UE. Alternatively, the periodicity can be in units of time (e.g., X ms, Y ms, Z ms).

Figure 4:
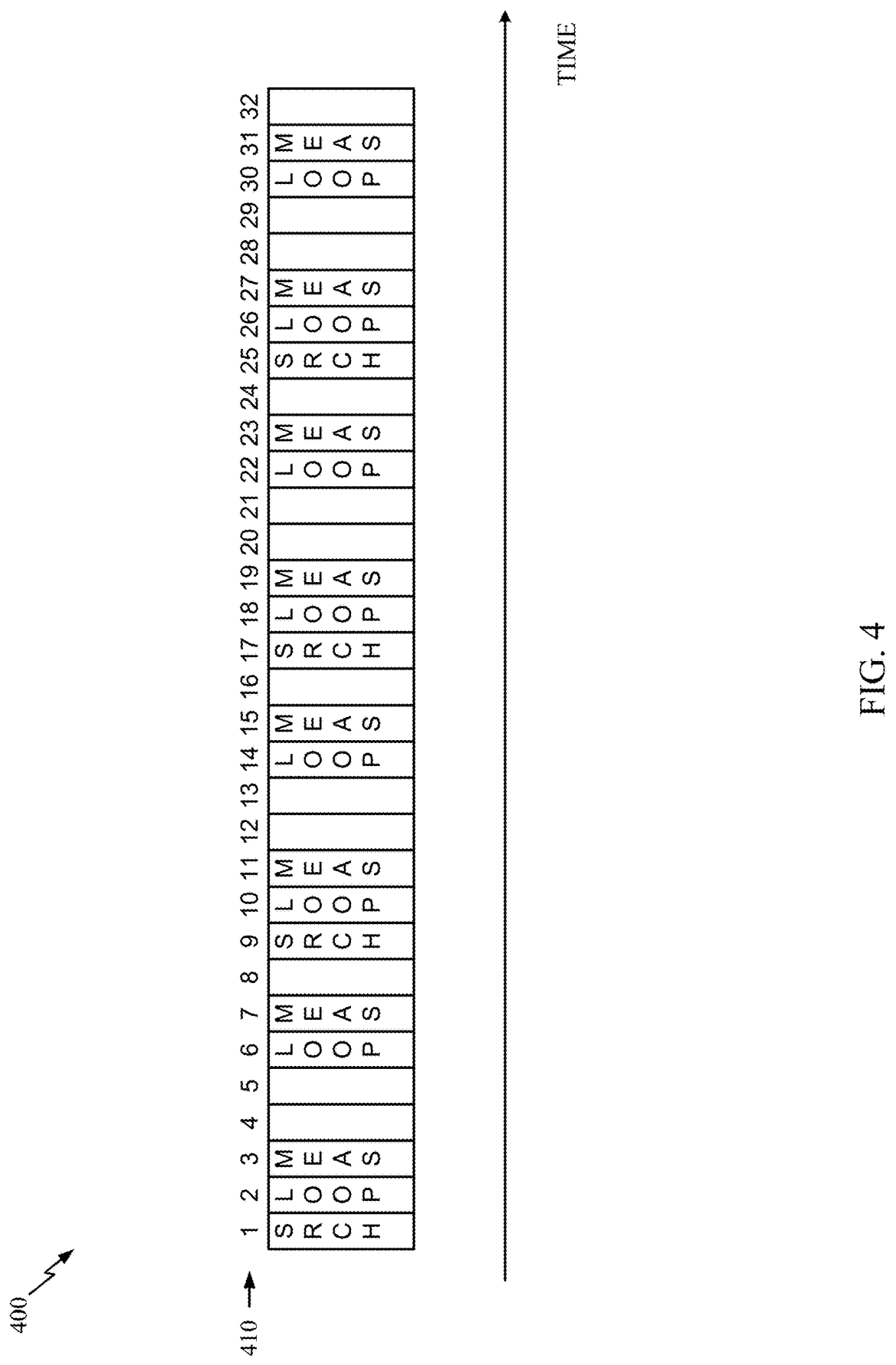
FIG. 4 is an example search, measurement, and loop tracking scheduling timeline of a UE, in accordance with certain aspects of the present disclosure.

FIG. 4 is an example search, measurement, and loop tracking scheduling timeline 400, in accordance with aspects of the present disclosure. In the example scheduling timeline 400, a series of SSBS occasions are shown at 420. Indices of the synchronization signal burst sets are shown at 410. In the example scheduling timeline, in each SSBS occasion a UE (e.g., UE 120a, shown in FIGS. 1 and 2) performs search, measurement, loop tracking, or sleep. In the example scheduling timeline, SSBS transmission occasions for which the UE performs search are marked "SRCH." Similarly, SSBS transmission occasions for which the UE performs measurement are marked "MEAS." SSBS transmission occasions for which the UE performs loop tracking are marked "LOOP." SSBS transmission occasions for which the UE sleeps are unmarked.

As discussed above, the periodicities for performing search, measurement, loop tracking, or sleep may involve a tradeoff between performance of the UE and power consumption by the UE.

Techniques and apparatus are desirable for a smart periodicity scaling framework in 5G NR communications to improve both performance and power consumption.

Example Adapting Search, Measurement, and Loop Tracking Periodicities in New Radio Communications Aspects of the present disclosure provide techniques and apparatus for adapting search, measurement, and loop tracking periodicities in new radio communications. A user equipment (UE) (e.g., such as UE 120a, shown in FIGS. 1 and 2) may determine periodicities for performing search, measurement, loop tracking, and sleeping. The determination may be based on inputs from multiple sources, which may one or more parameters internally at the UE and and/or one or more parameters external to the UE.

Based on internal sources at the UE, the UE may determine the periodicities based on a serving cell signal quality, such as signal to noise ratio (SNR) of the serving cell for the UE or a reference signal received quality (RSRQ) of the serving cell. The UE may determine the periodicities based on a number of candidate cells and/or beams that the UE determines to measure, based on frequency tracking loop (FTL) error feedback, timing tracking loop (TTL) error feedback, based on beam failure detection (BFD) status, radio link monitoring (RLM) status, uplink block error rate (BLER), downlink BLER, and/or an operating configuration. The operation configuration may include whether the UE is configured to operate in a connected discontinuous reception (CDRX) mode.

Based on external sources (e.g., external sensors of the UE), the UE can determine mobility status of the UE, such as rotation, displacement, or both. The UE may apply sensor fusing techniques to determine the mobility status of the UE. The UE can dynamically adapt the search, measurement, loop tracking, and/or sleep periodicities of the UE based on the mobility status.

In aspects of the present disclosure, the UE may determine or select a mode from a plurality of modes and/or submodes. Each mode and submode has a corresponding periodicity for performing search (SRCH), a corresponding periodicity for performing measurement (MEAS), and a corresponding periodicity for performing loop tracking (LOOP). Generally, the scheduling may prioritize loop tracking and measurement over search, and prioritize all of loop tracking, measurement, and search, over sleep.

The plurality of modes may include a "normal" mode. The normal mode may be determined or selected when the serving cell signal quality is good, tracking errors are small, and the UE is not in a high mobility state. For example, the normal mode may be determined or selected when the serving cell SNR and/or RSRQ is high (e.g., above a defined threshold for the normal mode), FTL and/or TTL errors are small (e.g., below an error threshold for the normal mode), and/or the UE is static or with slow mobility (e.g., below a mobility threshold for the normal mode). In the normal mode, the UE sets the search periodicity and measurement periodicity such that the UE can meet desired search and measurement parameters (e.g., requirements defined in wireless communications standards, such as 3GPP standards) with some margin. Also in the normal mode, the UE sets the loop tracking periodicity such that FTL, TTL, and/or AGC loops can converge without introducing much error.

Figure 5:
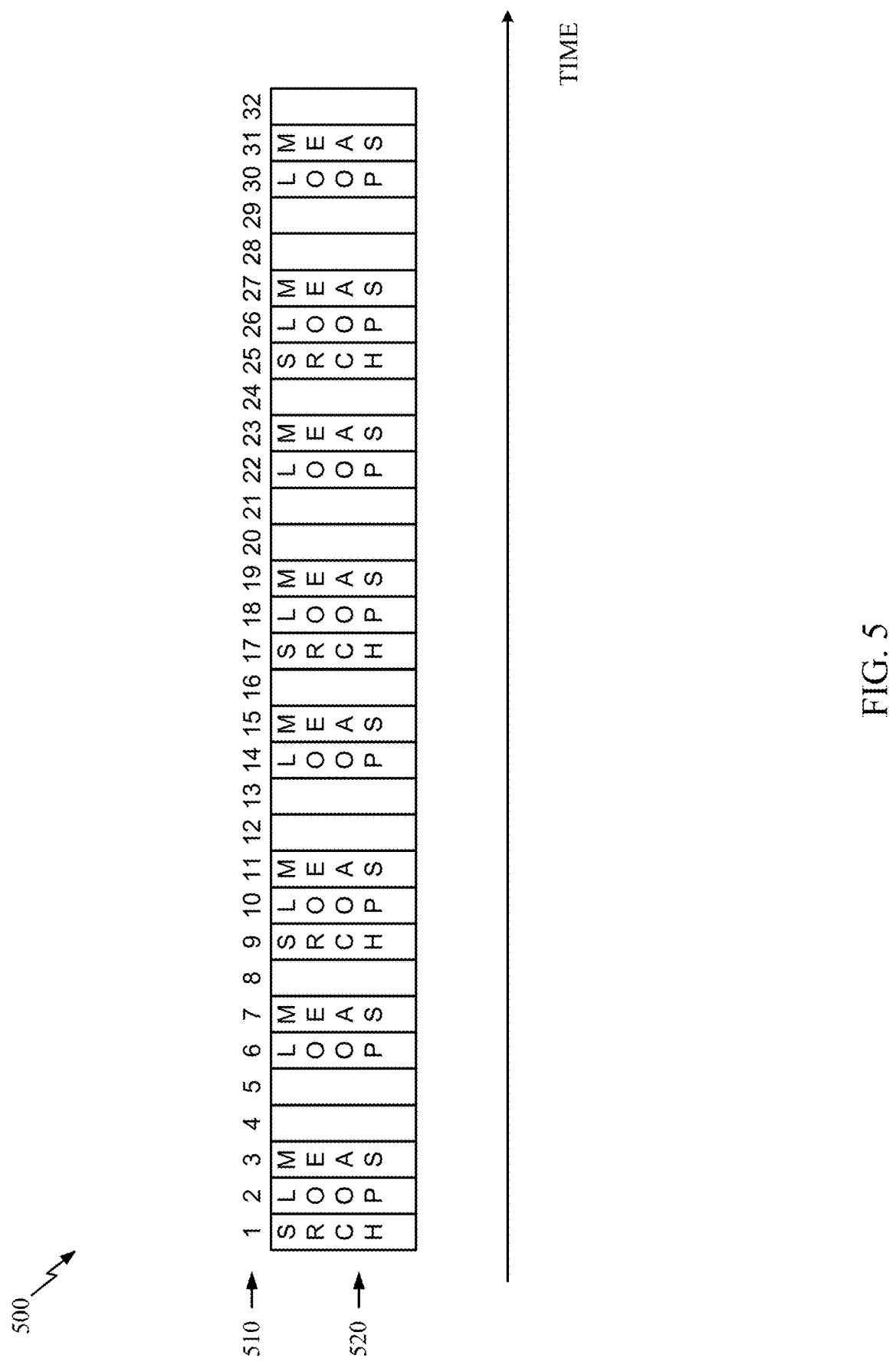
FIG. 5 is an example search, measurement, and loop tracking scheduling timeline of a UE that is in a normal mode, in accordance with certain aspects of the present disclosure.

FIG. 5 is an example search, measurement, and loop tracking scheduling timeline 500 for a UE in a normal mode, in accordance with aspects of the present disclosure. In the example scheduling timeline 500, one of search, measurement, loop tracking, or sleep can be performed in each reference signal occasion 510 with indices 520, such as a synchronization signal block set (SSBS) transmission occasions, SSB measurement timing configuration (SMTC) windows, or connected mode discontinuous reception (CDRX) cycles. In the example scheduling timeline 500 for the normal mode, the UE. As shown, in the normal mode, the UE periodicities for search, measurement, and loop may be relatively large, and the UE has several opportunities for sleep. Generally, loop tracking and measurement may be performed more frequently than sleep. In the example scheduling timeline 500, search is performed at a periodicity of once every nine RS occasions (e.g., SSBS indices 1, 9, 17, 25, and so on); while loop tracking an measurement are performed at a periodicity of once every four RS occasions (e.g., loop tracking is in SSBS indices 2, 6, 10, ... 30, as so on); and sleep is performed at a periodicity of twice every eight RS occasions and also once every nine RS occasions.

In aspects of the present disclosure, the plurality of modes may include an intensive loop tracking mode (e.g., a LOOP panic mode) that the UE may enter when loop tracking error is large. For example, the UE may determine or select the loop tracking mode when FTL error and/or TTL error is large (e.g., exceeds an FTL and/or TTL threshold). The intensive loop tracking mode may be further divided into multiple sub-modes based on error level. In the intensive loop tracking mode, the UE sets a low loop tracking periodicity, such that loop tracking is performed more frequently, in order for the UE to maintain FTL, TTL, and/or AGC loops of the UE.

Figure 6:
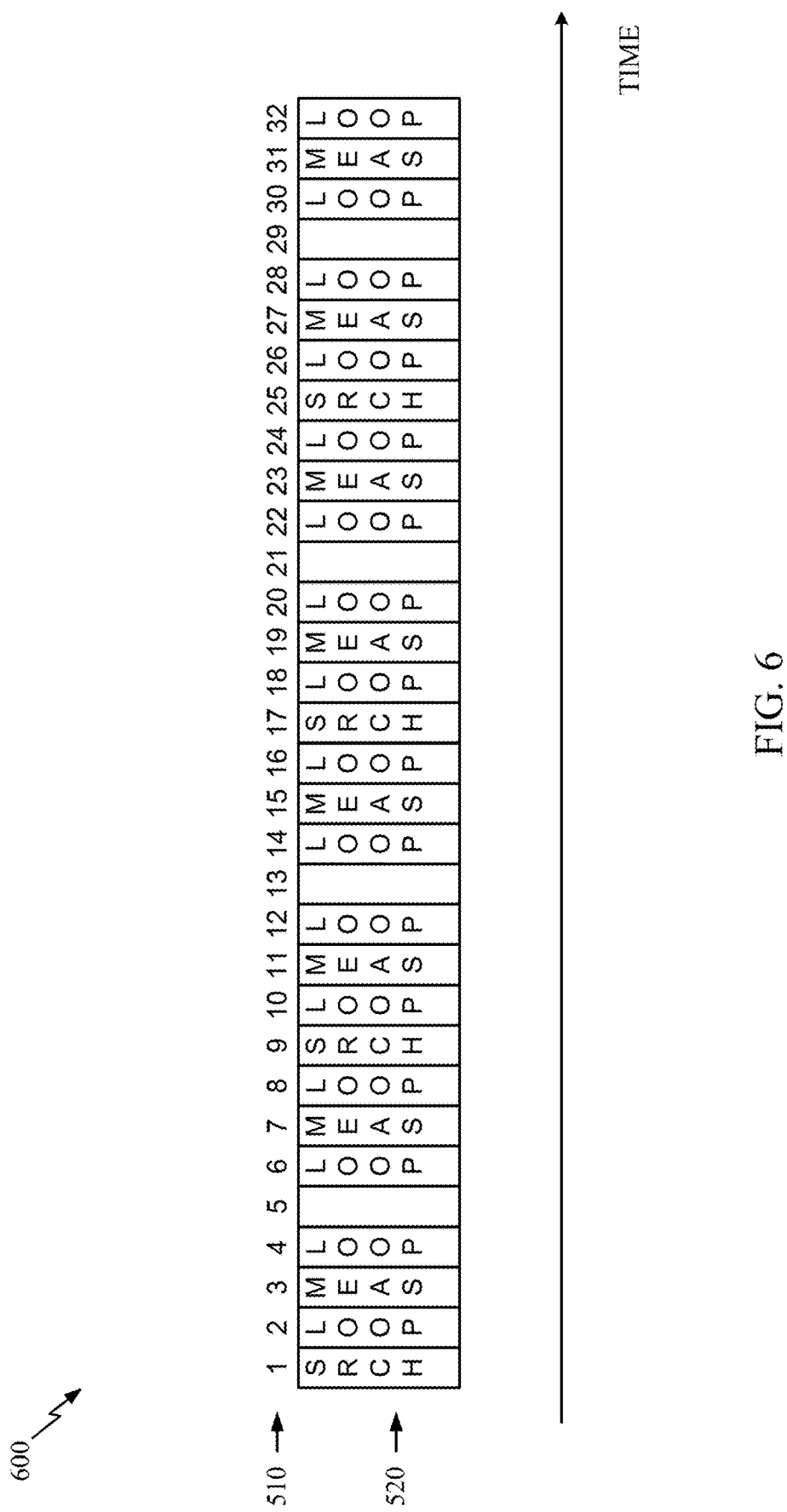
FIG. 6 is an example search, measurement, and loop tracking scheduling timeline of a UE that is in an intensive loop tracking mode, in accordance with certain aspects of the present disclosure.

FIG. 6 is an example search, measurement, and loop tracking scheduling timeline 600 for a UE in an intensive loop tracking mode, in accordance with aspects of the present disclosure. In example scheduling timeline 600 for the loop tracking intensive mode, loop tracking is scheduled more frequently, with a lower periodicity, than in the normal mode. In example scheduling timeline 600, loop tracking is scheduled more frequently than search and more frequently than measurement. As shown in example scheduling timeline 600, loop tracking is scheduled with a periodicity of once every two RS occasions. The additional loop tracking may be scheduled in sleep occasions, such that the search and measurement may still be performed at the same periodicity as they would in the normal mode. The additional loop tracking opportunities may help the UE to maintain its loops.

According to aspects of the present disclosure, the plurality of modes may include an intensive measurement mode (e.g., a MEAS panic mode) that the UE may enter when mobility is relatively high, when the signal quality is relatively poor, and/or when beam quality is relatively poor. For example, the UE may determine or select the intensive measurement mode when the UE has some mobility within the coverage of a serving cell (e.g., a mobility status above a mobility threshold), SNR and/or RSRQ from the serving cell is not very good (e.g., below an SNR and/or RSRP threshold), and/or BFD is declared by the UE. In some aspects of the present disclosure, the intensive measurement mode may be further divided to multiple sub-modes based on SNR of the serving cell, RSRQ of the serving cell, number of candidate beams, and/or BFD status. In the intensive measurement mode, the UE sets a more frequent measurement periodicity in order to track good beams and/or cells for mobility support.

Figure 7:
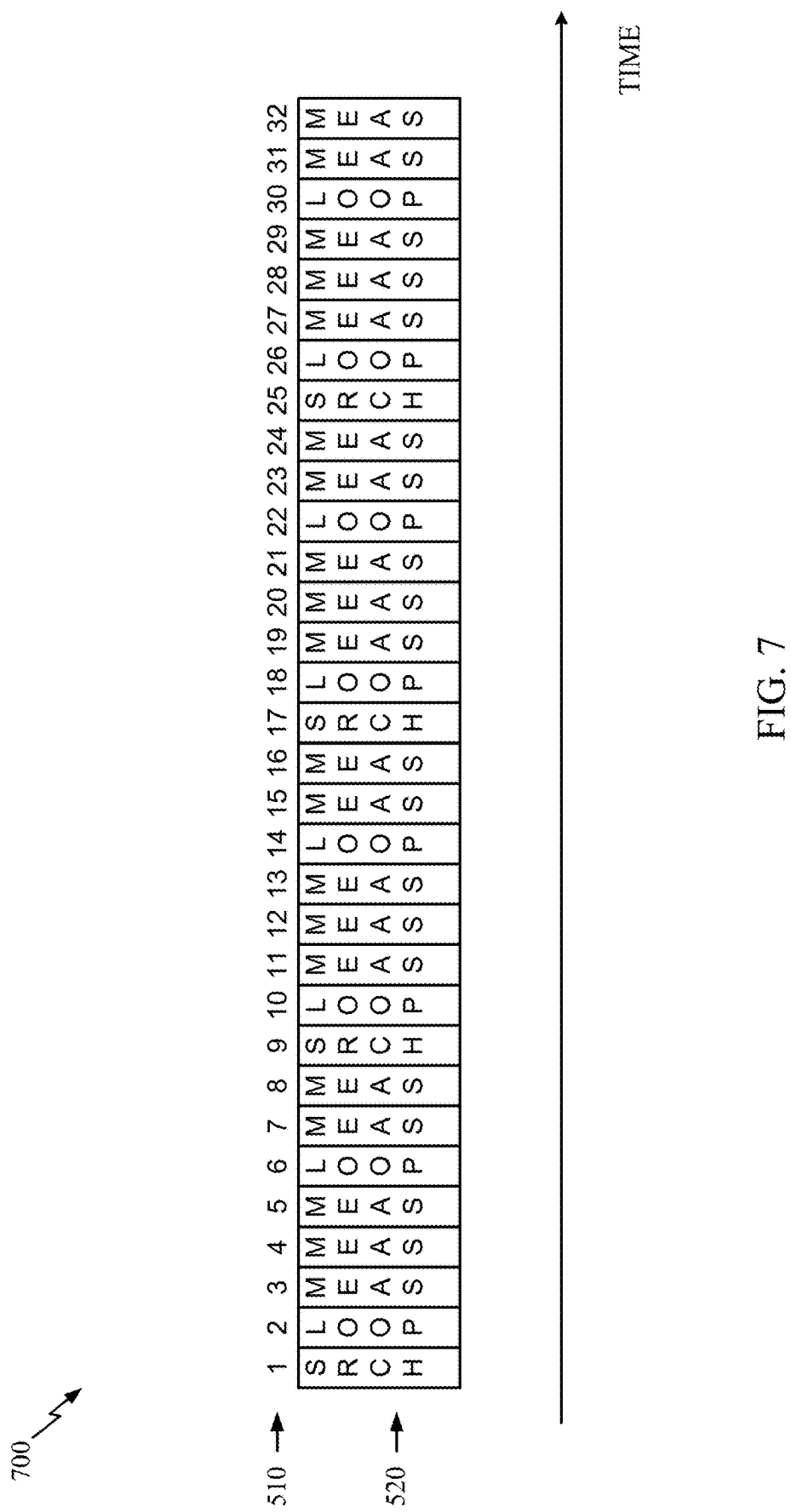
FIG. 7 is an example search, measurement, and loop tracking scheduling timeline of a UE that is in an intensive measurement mode, in accordance with certain aspects of the present disclosure.

FIG. 7 is an example search, measurement, and loop tracking scheduling timeline 700 for a UE in an intensive measurement mode, in accordance with aspects of the present disclosure. In the example scheduling timeline 700, for the intensive measurement mode, measurement is scheduled more frequently, with a lower periodicity, than in the normal mode. In example scheduling timeline 700, measurement is scheduled more frequently than search and more frequently than loop tracking. As shown in example scheduling timeline 700, measurement is scheduled with a periodicity of five of every eight RS occasions. The additional measurement may be scheduled in sleep occasions, such that the search and loop tracking may still be performed at the same periodicity as they would in the normal mode. The additional measurement opportunities may help the UE find a better cell and/or beam sooner.

In aspects of the present disclosure, the plurality of modes may include an intensive search mode (e.g., SRCH panic mode) that a UE may enter when the UE is in high mobility, is at cell edge, the signal quality of the serving cell is poor, serving beam quality is poor, and/or higher block error (BLER) is detected. For example, the intensive search mode may be determined or selected by the UE when the UE mobility is above a mobility threshold for the intensive search mode, SNR of the serving cell is low (e.g., below an SNR threshold), RSRQ of the serving cell is low (e.g., below an RSRP threshold), BFD is declared by the UE, radio link failure (RLF) is declared by the UE, high UL BLER is detected by the UE (e.g., exceeds an UL BLER threshold), and/or high DL BLER is detected by the UE (e.g., exceeds a DL BLER threshold). In some aspects of the present disclosure, the intensive search mode may be further divided into multiple sub-modes based on SNR, RSRQ, and/or RLM status. In the intensive search mode, the UE sets a more frequent search periodicity in order to discover new good cells and/or beams.

Figure 8:
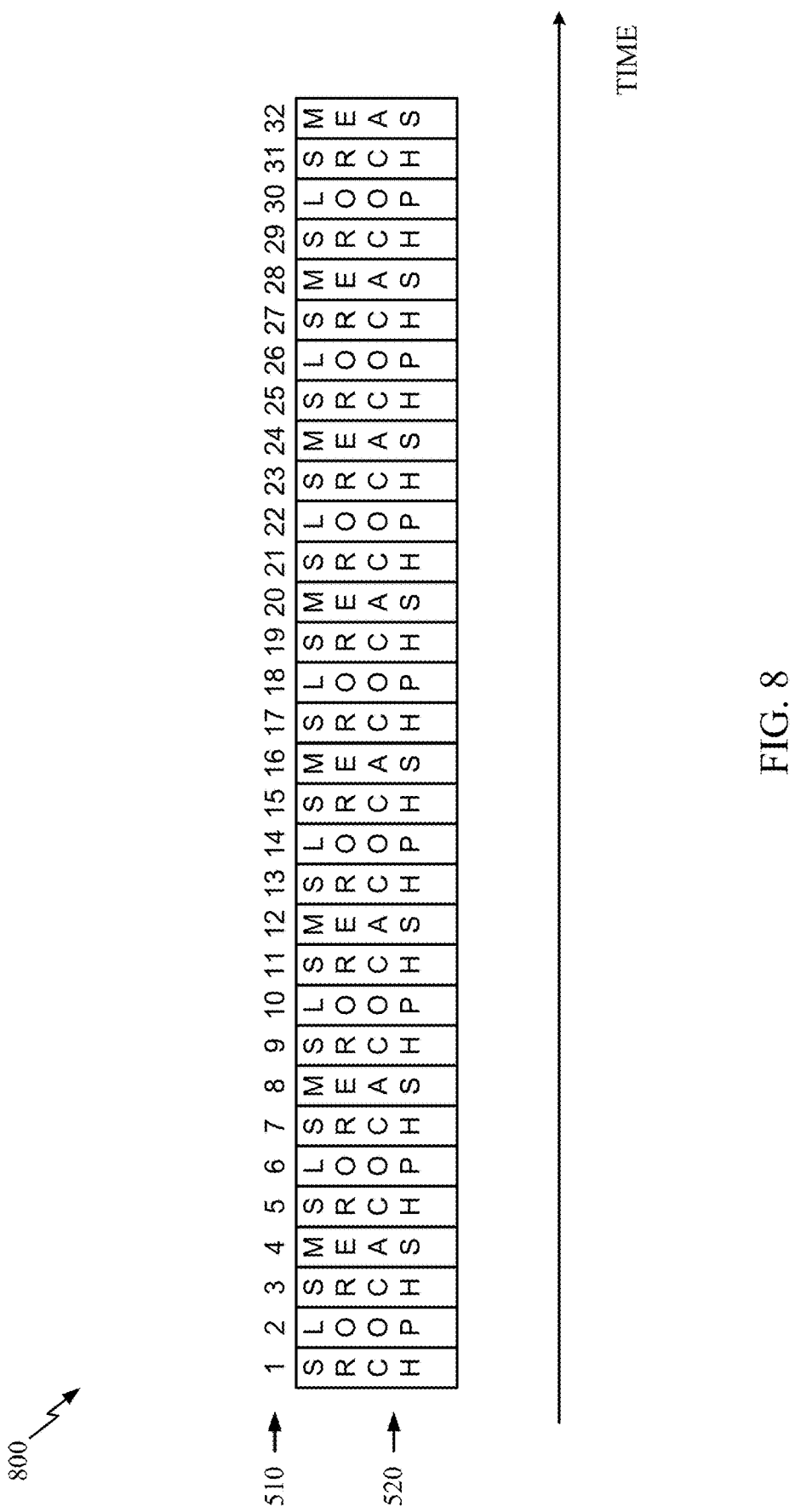
FIG. 8 is an example search, measurement, and loop tracking scheduling timeline of a UE that is in an intensive search mode, in accordance with certain aspects of the present disclosure.

FIG. 8 is an example search, measurement, and loop tracking scheduling timeline 800 for a UE in an intensive search mode, in accordance with aspects of the present disclosure. In the example scheduling timeline 800, for the intensive search mode, search is scheduled more frequently, with a lower periodicity, than in the normal mode. In example scheduling timeline 800, search is scheduled more frequently than measurement and more frequently than loop tracking. As shown in example scheduling timeline 800, search is scheduled with a periodicity of once every two RS occasions. The number of sleep occasions scheduled may be reduced or eliminated, such that the measurement and loop tracking may still be performed at the same periodicity as they would in the normal mode. The additional search opportunities may help the UE find a new cell and/or beam sooner.

According to aspects of the present disclosure, periodicities of search, measurement, and loop tracking may be based, at least in part, on different operating configurations of the UE. For example, the periodicities may be different depending on whether the UE is configured for connected mode discontinuous reception (CDRX). In CDRX, the UE can make signaling-free transitions between sleep and awake states. During the CDRX cycle, the UE may have on duration in which the UE monitors paging from the network and off durations in which the UE may be in a low power state and does not monitor paging to conserve battery power. Table 900 in FIG. 9, shows example search periodicities for when the UE is configured with CDRX and when the UE is configured without CDRX, for the normal mode, an intermediate search mode, and for the intensive search mode. Table 1000 in FIG. 10, shows example measurement periodicities for when the UE is configured with CDRX and when the UE is configured without CDRX, for the normal mode, a first intermediate measurement mode, a second intermediate measurement mode, and for the intensive measurement mode. Table 1100 in FIG. 11, shows example loop tracking periodicities for when the UE is configured with CDRX and when the UE is configured without CDRX, for the normal mode, a first intermediate loop tracking mode, a second intermediate loop tracking mode, and for the intensive loop tracking mode.

Figure 12:
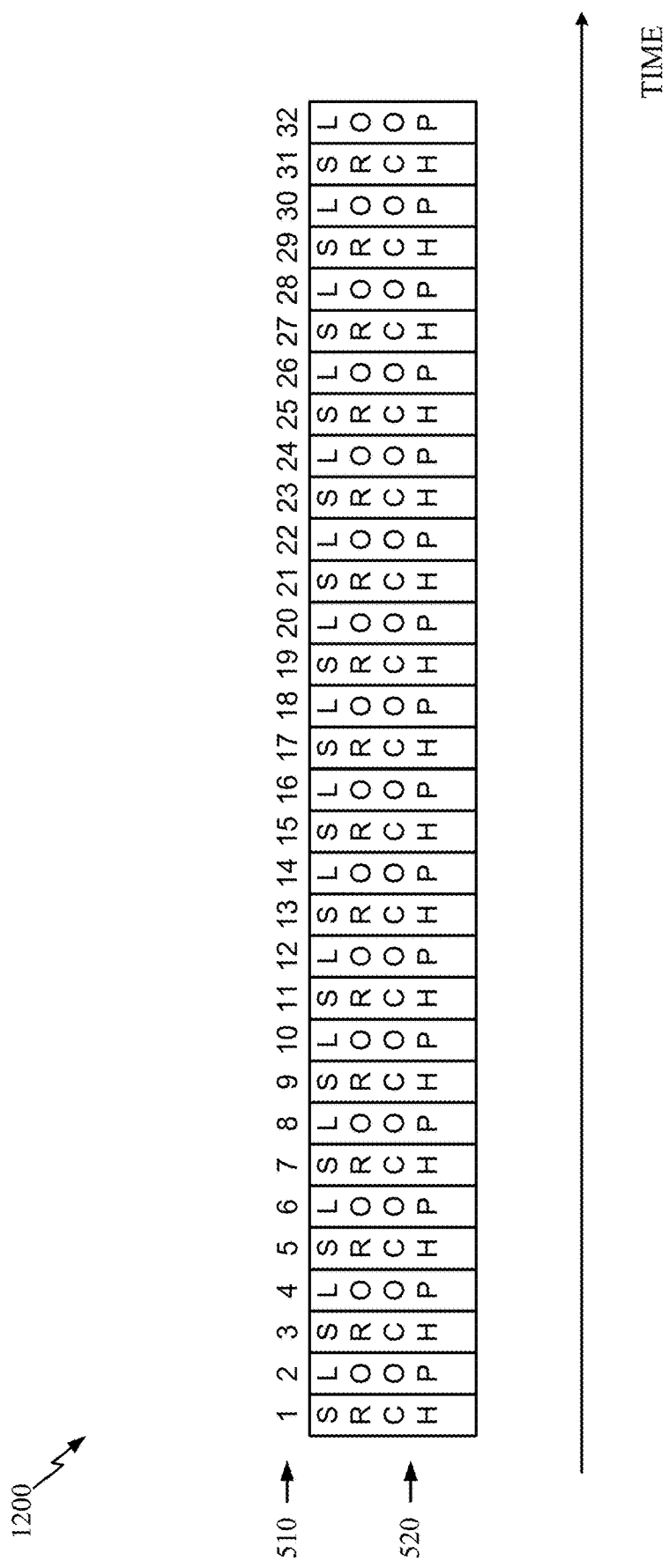
FIG. 12 is an example search, measurement, and loop tracking scheduling timeline of a UE that attempts to enter the intensive search mode, intensive measurement mode, and the intensive loop tracking mode simultaneously, in accordance with certain aspects of the present disclosure.

In some cases, the UE may be in a panic mode for search, measurement, and loop tracking. In this scenario, periodicities of the search, measurement, and loop tracking may collide at a same RS occasion for a UE. To schedule the search, measurement, and loop tracking, he UE may follow a priority list to mitigate the collision. For example, the UE may place highest priority on searching, next highest priority on loop tracking, and lowest priority on measurement (e.g., SRCH priority>LOOP priority>MEAS priority). The UE may not schedule any sleep in this scenario. In an illustrative example, following this priority, the UE may schedule according to example search, measurement, and loop tracking scheduling timeline 1200 shown in FIG. 12. As shown, all of the sleep and measurement opportunities (e.g., with respect to the normal mode) are taken by measurement and loop tracking. In example scheduling timeline 1200, measurement and sleep are not scheduled, and search and loop are each scheduled with a periodicity of one every two RS opportunities.

In aspects of the present disclosure, a UE may use information from external sensor to aid the determination of the search, measurement, and loop tracking periodicities. In some cases, the external sensors can be used to determine one or more of the parameters described herein for determining the periodicities. In some examples, the UE may determine orientation and displacement information from one or more of a magnetometer, gyroscope, accelerometer, and other sensors of the UE. The UE may use the information to determine or select a mode, such as the normal mode, intensive search mode, intensive measurement mode, intensive loop tracking mode, or a submode. For example, if the UE is completely stable according to sensor information, then the UE may select search and measurement periodicities according to the normal mode. In another example, a UE may predict one or more best beams (e.g., beams having best channel characteristics for transmission to a BS) based on information from sensors of the UE and beam direction information. The UE may them apply the characteristics of the predicted best beams in performing loop tracking.

While aspects of the present disclosure are described herein with reference to SSBS, aspects of the present disclosure may be applied to other types of reference signals, including channel state information reference signals (CSI-RS) and tracking reference signals (TRS, e.g., phase-tracking reference signals).

Figure 13:
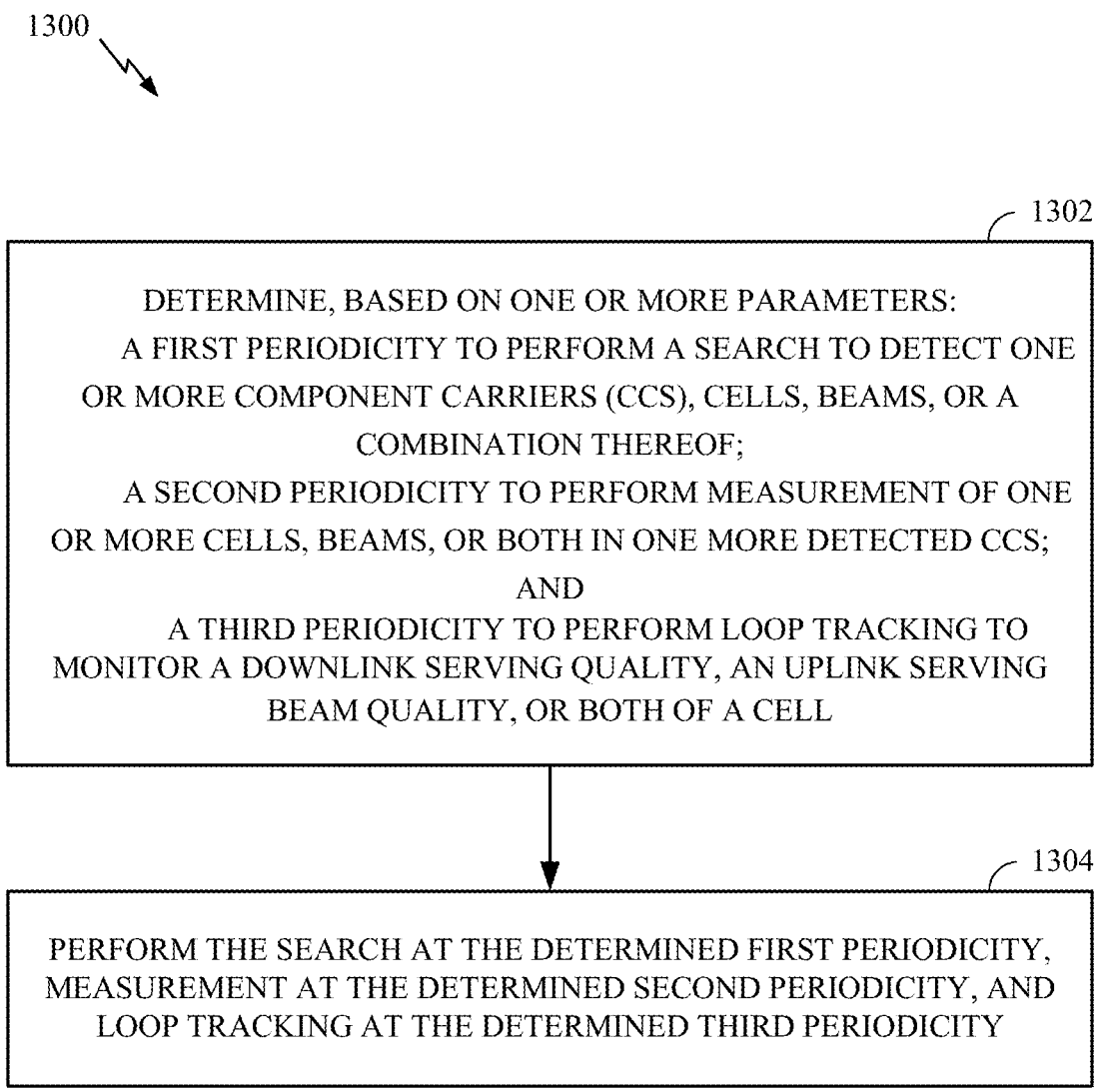
FIG. 13 is a flow diagram illustrating example operations for wireless communication by a UE, in accordance with certain aspects of the present disclosure.

FIG. 13 is a flow diagram illustrating example operations 1300 for wireless communication, in accordance with certain aspects of the present disclosure. Operations 1300 may be performed, for example, by UE (e.g., UE 120a in the wireless communication network 100). Operations 1300 may be implemented as software components that are executed and run on one or more processors (e.g., controller/processor 280 of FIG. 2). Further, the transmission and reception of signals by the UE in operations 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1300 may begin, at 1302, by determining, based on one or more parameters, a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell.

Operations 1300 may continue at 1304, by performing the search at the determined first periodicity, measurement at the determined second periodicity, and loop tracking at the determined third periodicity.

In certain aspects, the one or more parameters may include a signal quality metric related to reception of a reference signal of the serving cell. In certain aspects, the one or more parameters may include a number of candidate cells neighboring or potentially neighboring the serving cell that the UE is configured to measure.

In certain aspects, the one or more parameters may include a number of candidate beams that the UE is configured to measure. In certain aspects, the one or more parameters may include at least one of a frequency tracking loop (FTL) feedback, a timing tracking loop (TTL) feedback, or a combination thereof.

In certain aspects, the one or more parameters may include at least one of an uplink block error rate (BLER), a downlink BLER, or a combination thereof. In certain aspects, the one or more parameters may include a mobility status of the UE, an orientation of the UE, a displacement of the UE, or a combination thereof.

In certain aspects, the determining at 1302 may include determining that the UE is in one of a number of modes, based on the one or more parameters. Each mode may include a corresponding first periodicity to perform the search, a corresponding second periodicity to perform the measurement, and a corresponding third periodicity to perform the loop tracking. In some cases, the number of modes may include a normal mode. In the normal mode, the second periodicity for performing the measurement and the third periodicity for performing the loop tracking are shorter than the first periodicity for performing the search.

In some cases, the number of modes may include an intensive loop tracking mode. In the intensive loop tracking mode, the third periodicity for performing the loop tracking is shorter than the first periodicity for performing the search and shorter than the second periodicity for performing the measurement. In this mode, the second periodicity for performing the measurement is shorter than the first periodicity for performing the search.

In some cases, the number of modes may include an intensive measuring mode. In the intensive measuring mode, the second periodicity for performing the measurement is shorter than the first periodicity for performing the search and shorter than the third periodicity for performing the loop tracking. In this mode, the third periodicity for performing the loop tracking is shorter than the first periodicity for performing the search.

In some cases, the number of modes may include an intensive searching mode. In the intensive searching mode, the first periodicity for performing the search is shorter than the second periodicity for performing the measurement and shorter than the third periodicity for performing the loop tracking.

In certain aspects, the determining the first periodicity, the second periodicity, and the third periodicity is further based on performing the search having a higher priority than performing the measurement and performing the loop tracking; and performing the loop tracking having a higher priority than performing the measurement.

In certain aspects, the determining the first periodicity, the second periodicity, and the third periodicity is further based on whether connected mode discontinuous reception (CDRX) is configured at the UE.

In certain aspects, the determining the first periodicity for performing the search, the second periodicity for performing the measurement, and the third period for performing the loop tracking comprises determining synchronization signal burst sets (SSBSs).

In certain aspects, at least one of: performing the search, performing the measurement, or performing the loop tracking is performed using one or more channel state information reference signals (CSI-RSs), one or more tracking reference signals (TRSs), or a combination thereof.

In certain aspects, operations 1300 may further include determining, based on the one or more parameters, a fourth periodicity to enter a sleep mode.

In certain aspects, performing the loop tracking may include performing at least one of: radio link monitoring (RLM), beam failure detection (BFD), beam failure recovery (BFR), path loss tracking, or a combination thereof. For example, in some cases, performing the loop tracking comprises maintaining a frequency tracking loop (FTL), a timing tracking loop (TTL), an automatic gain control (AGC) loop, or a combination thereof.

Figure 14:
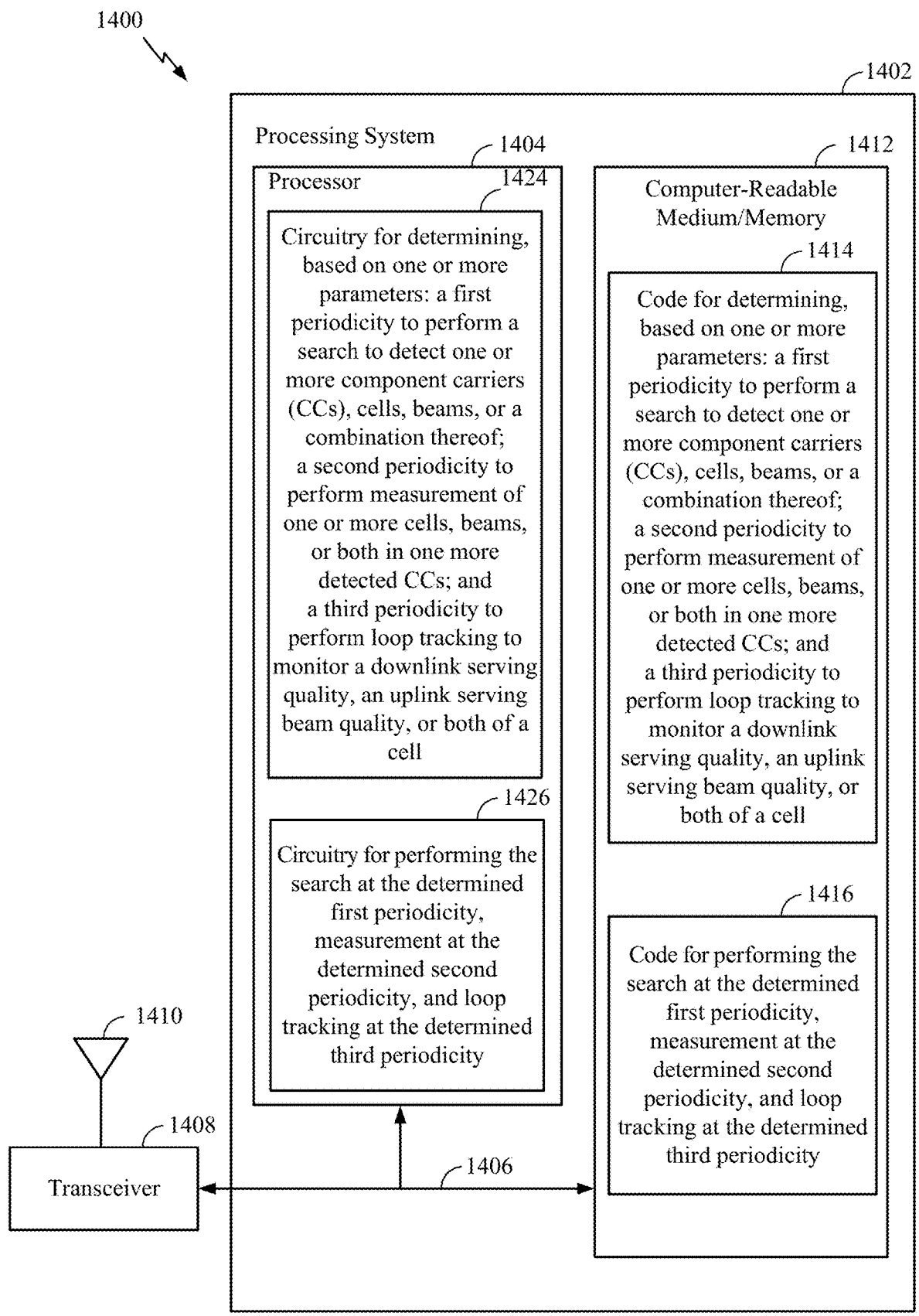
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations 1300 illustrated in FIG. 13. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations 1300 illustrated in FIG. 13, or other operations for performing the various techniques discussed herein for adapting search, measurement, and loop tracking periodicities in new radio communications. In certain aspects, computer-readable medium/memory 1412 stores code 1414 for determining, based on one or more parameters: a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell; and code 1416 for performing the search at the determined first periodicity, measurement at the determined second periodicity, and loop tracking at the determined third periodicity.

In certain aspects, the processor 1404 has circuitry configured to implement the code stored in the computer-readable medium/memory 1412. The processor 1404 includes circuitry (e.g., corresponding to means-plus-function components) 1424 for determining, based on one or more parameters: a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell; and circuitry 1426 for performing the search at the determined first periodicity, measurement at the determined second periodicity, and loop tracking at the determined third periodicity.

Example Aspects

In addition to the various aspects described above, the aspects can be combined. Some specific combinations of aspects are detailed below:

Aspect 1: A method of wireless communication by a user equipment (UE), comprising: determining how often to perform search, measurement, and loop tracking of at least one beam of one of a serving cell for the UE and cells neighboring or potentially neighboring the serving cell, based on one or more parameters indicative of a signal quality of the serving cell as received by the UE; and performing at least one of search, measurement, and loop tracking of the at least one beam of the serving cell and the cells neighboring or potentially neighboring the serving cell according to the determination.

Aspect 2: The method of Aspect 1, wherein the one or more parameters comprise at least one of: a metric related to reception of a reference signal of the serving cell, a signal to noise ratio (SNR) of the serving cell, a number of the cells neighboring or potentially neighboring the serving cell, a number of beams that the UE is configured to measure, frequency tracking loop (FTL) feedback, timing tracking loop (TTL) feedback, detection of a beam failure, a radio link monitoring (RLM) status, an uplink (UL) block error rate (BLER), a downlink (DL) BLER, or an operating configuration of the UE.

Aspect 3: The method of one of Aspects 1-2, wherein: the determining comprises determining that the UE is in one of a plurality of modes, based on the one or more parameters; and each mode has a corresponding periodicity for performing search of the at least one beam of the serving cell and of the cells neighboring or potentially neighboring the serving cell, a corresponding periodicity for performing measurement of the at least one beam of the serving cell and of the cells neighboring or potentially neighboring the serving cell, and a corresponding periodicity for the loop tracking of the at least one beam of the serving cell.

Aspect 4: The method of Aspect 3, wherein the plurality of modes includes: a normal mode; an intensive loop tracking mode wherein the corresponding periodicity for the loop tracking is shorter than each of a corresponding periodicity for the loop tracking in the normal mode, the corresponding periodicity for performing search of the at least one beam of the serving cell and of the cells neighboring or potentially neighboring the serving cell, and the corresponding periodicity for performing measurement of the at least one beam of the serving cell and of the cells neighboring or potentially neighboring the serving cell; an intensive measuring mode wherein the corresponding periodicity for performing measurement of the at least one beam of the serving cell and of the cells neighboring or potentially neighboring the serving cell is shorter than each of a corresponding periodicity for the performing measurement in the normal mode, the corresponding periodicity for performing search of the at least one beam of the serving cell and of the cells neighboring or potentially neighboring the serving cell, and the corresponding periodicity for the loop tracking; and an intensive searching mode wherein the corresponding periodicity for performing search of the at least one beam of the serving cell and of the cells neighboring or potentially neighboring the serving cell is shorter than each of a corresponding periodicity for the performing search in the normal mode, the corresponding periodicity for performing measurement of the at least one beam of the serving cell and of the cells neighboring or potentially neighboring the serving cell, and the corresponding periodicity for the loop tracking.

Aspect 5: The method of one of Aspects 1-4, wherein the determining is based on searching having a higher priority than measurement and loop tracking.

Aspect 6: The method of one of Aspects 1-5, wherein the determining is based on loop tracking having a higher priority than measurement.

Aspect 7: The method of one of Aspects 1-6, wherein the one or more parameters comprise an indication of at least one of orientation of the UE or displacement of the UE.

Aspect 8: The method of Aspect 7, wherein the one or more parameters comprise the indication of the orientation of the UE obtained from at least one of a magnetometer, gyroscope, or accelerometer of the UE.

Aspect 9: The method of Aspect 7, wherein the one or more parameters comprise the indication of the displacement of the UE obtained from at least one of a magnetometer, gyroscope, accelerometer of the UE, or a global navigation satellite system (GNSS) receiver of the UE.

Aspect 10: The method of one of Aspects 1-9, wherein the at least one of the search, the measurement, and the loop tracking is performed with respect to one or more synchronization signal burst sets (SSBSs).

Aspect 11: The method of one of Aspects 1-10, wherein the at least one of the search, the measurement, and the loop tracking is performed with respect to one or more channel state information reference signals (CSI-RSs).

Aspect 12: A method for wireless communications by a user equipment (UE), comprising: determining, based on one or more parameters: a first periodicity to perform a search to detect one or more component carriers (CCs), cells, beams, or a combination thereof a second periodicity to perform measurement of one or more cells, beams, or both in one more detected CCs; and a third periodicity to perform loop tracking to monitor a downlink serving quality, an uplink serving beam quality, or both of a cell; and performing the search at the determined first periodicity, measurement at the determined second periodicity, and loop tracking at the determined third periodicity.

Aspect 13: The method of Aspect 12, wherein the one or more parameters comprise a signal quality metric related to reception of a reference signal of the serving cell.

Aspect 14: The method of Aspect 12 or 13, wherein the one or more parameters comprise a number of candidate cells neighboring or potentially neighboring the serving cell that the UE is configured to measure.

Aspect 15: The method of any one of Aspects 12 to 14, wherein the one or more parameters comprise a number of candidate beams that the UE is configured to measure.

Aspect 16: The method of any one of Aspects 12 to 15, wherein the one or more parameters comprises at least one of: a frequency tracking loop (FTL) feedback, a timing tracking loop (TTL) feedback, or a combination thereof.

Aspect 17: The method of any one of Aspects 12 to 16, wherein the one or more parameters comprise at least one of detection of a beam failure or a radio link monitoring (RLM) status.

Aspect 18: The method of any one of Aspects 12 to 17, wherein the one or more parameters comprise at least one of: an uplink block error rate (BLER), a downlink BLER, or a combination thereof.

Aspect 19: The method of any one of Aspects 12 to 18, wherein the one or more parameters comprise a mobility status of the UE, an orientation of the UE, a displacement of the UE, or a combination thereof.

Aspect 20: The method of any one of Aspects 12 to 20, wherein: the determining comprises determining that the UE is in one of a plurality of modes, based on the one or more parameters; and each mode has a corresponding first periodicity to perform the search, second periodicity to perform the measurement, and third periodicity to perform the loop tracking.

Aspect 21: The method of Aspect 20, wherein the plurality of modes includes at least: a normal mode, wherein in the normal mode: the second periodicity for performing the measurement and the third periodicity for performing the loop tracking are shorter than the first periodicity for performing the search; an intensive loop tracking mode, wherein in the intensive loop tracking mode: the third periodicity for performing the loop tracking is shorter than the first periodicity for performing the search and shorter than the second periodicity for performing the measurement; and the second periodicity for performing the measurement is shorter than the first periodicity for performing the search; an intensive measuring mode, wherein in the intensive measurement mode: the second periodicity for performing the measurement is shorter than the first periodicity for performing the search and shorter than the third periodicity for performing the loop tracking; and the third periodicity for performing the loop tracking is shorter than the first periodicity for performing the search; and an intensive searching mode, wherein in the intensive searching mode: the first periodicity for performing the search is shorter than the second periodicity for performing the measurement and shorter than the third periodicity for performing the loop tracking.

Aspect 22: The method of any one of Aspects 12 to 21, wherein the determining the first periodicity, the second periodicity, and the third periodicity is further based on: performing the search having a higher priority than performing the measurement and performing the loop tracking; and performing the loop tracking having a higher priority than performing the measurement.

Aspect 23: The method of any one of Aspects 12 to 22, wherein the determining the first periodicity, the second periodicity, and the third periodicity is further based on whether connected mode discontinuous reception (CDRX) is configured at the UE.

Aspect 24: The method of any one of Aspects 12 to 23, wherein determining the first periodicity for performing the search, the second periodicity for performing the measurement, and the third period for performing the loop tracking comprises determining synchronization signal burst sets (SSBSs).

Aspect 25: The method of any one of Aspects 12 to 24, wherein at least one of: performing the search, performing the measurement, or performing the loop tracking is performed using one or more channel state information reference signals (CSI-RSs), one or more tracking reference signals (TRSs), or a combination thereof.

Aspect 26: The method of any one of Aspects 12 to 25, further comprising: determining, based on the one or more parameters, a fourth periodicity to enter a sleep mode.

Aspect 27: The method of any one of Aspects 12 to 26, performing the loop tracking comprises performing at least one of: radio link monitoring (RLM), beam failure detection (BFD), beam failure recovery (BFR), path loss tracking, or a combination thereof.

Aspect 28: The method of Aspect 27, wherein performing the loop tracking comprises maintaining a frequency tracking loop (FTL), a timing tracking loop (TTL), an automatic gain control (AGC) loop, or a combination thereof.

Aspect 29: An apparatus for wireless communications by a user equipment (UE), comprising: a memory; and at least one processor coupled to the memory, the at least one processor configured to: determine, based on one or more parameters: a first periodicity to perform a search to detect one or more component carriers (CCs), cells, beams, or a combination thereof a second periodicity to perform measurement of one or more cells, beams, or both in one more detected CCs; and a third periodicity to perform loop tracking to monitor a downlink serving quality, an uplink serving beam quality, or both of a cell; and perform the search at the determined first periodicity, measurement at the determined second periodicity, and loop tracking at the determined third periodicity.

Aspect 30: The apparatus of Aspect 29, wherein the one or more parameters comprise a signal quality metric related to reception of a reference signal of the serving cell.

Aspect 31: The apparatus of Aspect 29 or 30, wherein the one or more parameters comprise a number of candidate cells neighboring or potentially neighboring the serving cell that the UE is configured to measure.

Aspect 32: The apparatus of any one of Aspects 29 to 31, wherein the one or more parameters comprise a number of candidate beams that the UE is configured to measure.

Aspect 33: The apparatus of any one of Aspects 29 to 32, wherein the one or more parameters comprises at least one of: a frequency tracking loop (FTL) feedback, a timing tracking loop (TTL) feedback, or a combination thereof.

Aspect 34: The apparatus of any one of Aspects 29 to 33, wherein the one or more parameters comprise at least one of detection of a beam failure or a radio link monitoring (RLM) status.

Aspect 35: The apparatus of any one of Aspects 29 to 34, wherein the one or more parameters comprise at least one of: an uplink block error rate (BLER), a downlink BLER, or a combination thereof.

Aspect 36: The apparatus of any one of Aspects 29 to 35, wherein the one or more parameters comprise a mobility status of the UE, an orientation of the UE, a displacement of the UE, or a combination thereof.

Aspect 37: The apparatus of any one of Aspects 29 to 36, wherein: the determining comprises determining that the UE is in one of a plurality of modes, based on the one or more parameters; and each mode has a corresponding first periodicity to perform the search, second periodicity to perform the measurement, and third periodicity to perform the loop tracking.

Aspect 38: The apparatus of Aspect 37, wherein the plurality of modes includes at least: a normal mode, wherein in the normal mode: the second periodicity for performing the measurement and the third periodicity for performing the loop tracking are shorter than the first periodicity for performing the search; an intensive loop tracking mode, wherein in the intensive loop tracking mode: the third periodicity for performing the loop tracking is shorter than the first periodicity for performing the search and shorter than the second periodicity for performing the measurement; and the second periodicity for performing the measurement is shorter than the first periodicity for performing the search; an intensive measuring mode, wherein in the intensive measurement mode: the second periodicity for performing the measurement is shorter than the first periodicity for performing the search and shorter than the third periodicity for performing the loop tracking; and the third periodicity for performing the loop tracking is shorter than the first periodicity for performing the search; and an intensive searching mode, wherein in the intensive searching mode: the first periodicity for performing the search is shorter than the second periodicity for performing the measurement and shorter than the third periodicity for performing the loop tracking.

Aspect 39: The apparatus of any one of Aspects 29 to 38, wherein the determining the first periodicity, the second periodicity, and the third periodicity is further based on: performing the search having a higher priority than performing the measurement and performing the loop tracking; and performing the loop tracking having a higher priority than performing the measurement.

Aspect 40: A non-transitory computer readable medium storing instructions that when executed by a user equipment (UE) cause the UE to: determine, based on one or more parameters: a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell; and perform the search at the determined first periodicity, measurement at the determined second periodicity, and loop tracking at the determined third periodicity.

Aspect 41: An apparatus for wireless communication by a first user equipment (UE), comprising: means for determining, based on one or more parameters: a first periodicity to perform a search to detect one or more component carriers (CCs), cells, beams, or a combination thereof; a second periodicity to perform measurement of one or more cells, beams, or both in one more detected CCs; and a third periodicity to perform loop tracking to monitor a downlink serving quality, an uplink serving beam quality, or both of a cell; and means for performing the search at the determined first periodicity, measurement at the determined second periodicity, and loop tracking at the determined third periodicity.

Aspect 42: An apparatus for wireless communications, comprising means for performing one or more of the methods of claims 1-28.

Aspect 43: An apparatus for wireless communications, comprising: a memory; and a processor coupled to the memory, the memory and the processor configured to perform the method of one or more of claims 1-28.

Aspect 44: A computer-readable medium, the medium including instructions that, when executed by a processing system, cause the processing system to perform the method of one or more of claims 1-28.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications at a user equipment (UE), comprising:
   determining, based on one or more parameters:
      a first periodicity to perform a search to detect one or more component carriers (CCs), cells, beams, or a combination thereof;
      a second periodicity to perform measurement of one or more cells, beams, or both in one more detected CCs; and
      a third periodicity to perform loop tracking to monitor a downlink serving quality, an uplink serving beam quality, or both of a cell; and
   performing the search at the determined first periodicity, the measurement at the determined second periodicity, and the loop tracking at the determined third periodicity, wherein:
   the determination comprises determining that the UE is in one of a plurality of modes;
   each mode has corresponding first periodicity to perform the search, second periodicity to perform the measurement, and third periodicity to perform the loop tracking;
   the plurality of modes includes two or more of:
      a normal mode, wherein in the normal mode:
         the second periodicity for performing the measurement and the third periodicity for performing the loop tracking are shorter than the first periodicity for performing the search;
      an intensive loop tracking mode, wherein in the intensive loop tracking mode:
         the third periodicity for performing the loop tracking is shorter than the first periodicity for performing the search and shorter than the second periodicity for performing the measurement, and
         the second periodicity for performing the measurement is shorter than the first periodicity for performing the search;
      an intensive measuring mode, wherein in the intensive measurement mode:
         the second periodicity for performing the measurement is shorter than the first periodicity for performing the search and shorter than the third periodicity for performing the loop tracking, and
         the third periodicity for performing the loop tracking is shorter than the first periodicity for performing the search; and
      an intensive searching mode, wherein in the intensive searching mode:
         the first periodicity for performing the search is shorter than the second periodicity for performing the measurement and shorter than the third periodicity for performing the loop tracking.

2. The method of claim 1, wherein the one or more parameters comprise a signal quality metric related to reception of a reference signal of a serving cell.

3. The method of claim 1, wherein the determination of the first periodicity, the second periodicity, and the third periodicity is further based on:
   performing the search having a higher priority than performing the measurement and performing the loop tracking; and
   performing the loop tracking having a higher priority than performing the measurement.

4. The method of claim 1, wherein the determination of the first periodicity, the second periodicity, and the third periodicity is further based on whether connected mode discontinuous reception (CDRX) is configured at the UE.

5. The method of claim 1, wherein the determination of the first periodicity, the second periodicity, and the third period comprises determining synchronization signal burst sets (SSBSs).

6. The method of claim 1, wherein at least one of: performing the search, performing the measurement, or performing the loop tracking is performed using one or more channel state information reference signals (CSI-RSs), one or more tracking reference signals (TRSs), or a combination thereof.

7. The method of claim 1, further comprising:
determining, based on the one or more parameters, a fourth periodicity; and
entering a sleep mode at the determined fourth periodicity.

8. The method of claim 1, performing the loop tracking comprises performing at least one of radio link monitoring (RLM), beam failure detection (BFD), beam failure recovery (BFR), or path loss tracking.

9. The method of claim 1, wherein performing the loop tracking comprises maintaining a frequency tracking loop (FTL), a timing tracking loop (TTL), an automatic gain control (AGC) loop, or a combination thereof.

10. An apparatus for wireless communications, comprising:
a memory comprising instructions; and
at least one processor configured to execute the instructions and cause the apparatus to:
determine, based on one or more parameters:
a first periodicity to perform a search to detect one or more component carriers (CCs), cells, beams, or a combination thereof;
a second periodicity to perform measurement of one or more cells, beams, or both in one more detected CCs; and
a third periodicity to perform loop tracking to monitor a downlink serving quality, an uplink serving beam quality, or both of a cell; and
perform the search at the determined first periodicity, the measurement at the determined second periodicity, and loop tracking at the determined third periodicity, wherein:
the determination comprises determining that the UE is in one of a plurality of modes;
each mode has corresponding first periodicity to perform the search, second periodicity to perform the measurement, and third periodicity to perform the loop tracking;
the plurality of modes includes two or more of:
a normal mode, wherein in the normal mode:
the second periodicity for performing the measurement and the third periodicity for performing the loop tracking are shorter than the first periodicity for performing the search;
an intensive loop tracking mode, wherein in the intensive loop tracking mode:
the third periodicity for performing the loop tracking is shorter than the first periodicity for performing the search and shorter than the second periodicity for performing the measurement, and
the second periodicity for performing the measurement is shorter than the first periodicity for performing the search;
an intensive measuring mode, wherein in the intensive measurement mode:
the second periodicity for performing the measurement is shorter than the first periodicity for performing the search and shorter than the third periodicity for performing the loop tracking, and
the third periodicity for performing the loop tracking is shorter than the first periodicity for performing the search; and
an intensive searching mode, wherein in the intensive searching mode:
the first periodicity for performing the search is shorter than the second periodicity for performing the measurement and shorter than the third periodicity for performing the loop tracking.

11. The apparatus of claim 10, wherein the one or more parameters comprise a signal quality metric related to reception of a reference signal of a serving cell.

12. The apparatus of claim 10, wherein the one or more parameters comprises at least one of a frequency tracking loop (FTL) feedback or a timing tracking loop (TTL) feedback.

13. The apparatus of claim 10, wherein the one or more parameters comprise at least one of detection of a beam failure or a radio link monitoring (RLM) status.

14. The apparatus of claim 10, wherein the one or more parameters comprise at least one of an uplink block error rate (BLER) or a downlink BLER.

15. The apparatus of claim 10, wherein the one or more parameters comprise a mobility status of the apparatus, an orientation of the apparatus, a displacement of the apparatus, or a combination thereof.

16. The apparatus of claim 10, wherein the determination of the first periodicity, the second periodicity, and the third periodicity is further based on:
performing the search having a higher priority than performing the measurement and performing the loop tracking; and
performing the loop tracking having a higher priority than performing the measurement.

17. The apparatus of claim 10, further comprising a transceiver via which the search, the measurement and the loop tracking are performed, wherein the apparatus is configured as a user equipment.

18. A method for wireless communications at a user equipment (UE), comprising:
determining, based on one or more parameters:
a first periodicity to perform a search to detect one or more component carriers (CCs), cells, beams, or a combination thereof;
a second periodicity to perform measurement of one or more cells, beams, or both in one more detected CCs; and
a third periodicity to perform loop tracking to monitor a downlink serving quality, an uplink serving beam quality, or both of a cell; and
performing the search at the determined first periodicity, the measurement at the determined second periodicity, and the loop tracking at the determined third periodicity, wherein the determination of the first periodicity, the second periodicity, and the third periodicity is further based on:
performing the search having a higher priority than performing the measurement and performing the loop tracking; and
performing the loop tracking having a higher priority than performing the measurement.

19. The method of claim 18, wherein the one or more parameters comprise a signal quality metric related to reception of a reference signal of a serving cell.

20. The method of claim 18, wherein the one or more parameters comprise a number of candidate cells neighboring or potentially neighboring a serving cell that the UE is configured to measure.

21. The method of claim 18, wherein the one or more parameters comprise a number of candidate beams that the UE is configured to measure.

22. The method of claim 18, wherein the one or more parameters comprises at least one of a frequency tracking loop (FTL) feedback or a timing tracking loop (TTL) feedback.

23. The method of claim 18, wherein the one or more parameters comprise at least one of detection of a beam failure or a radio link monitoring (RLM) status.

24. The method of claim 18, wherein the one or more parameters comprise at least one of an uplink block error rate (BLER) or a downlink BLER.

25. The method of claim 18, wherein the one or more parameters comprise a mobility status of the UE, an orientation of the UE, or a displacement of the UE.

26. The method of claim 18, wherein:
the determining comprises determining that the UE is in one of a plurality of modes; and
each mode has a corresponding first periodicity to perform the search, second periodicity to perform the measurement, and third periodicity to perform the loop tracking.

27. The method of claim 26, wherein the plurality of modes includes two or more of:
a normal mode, wherein in the normal mode:
the second periodicity for performing the measurement and the third periodicity for performing the loop tracking are shorter than the first periodicity for performing the search;
an intensive loop tracking mode, wherein in the intensive loop tracking mode:
the third periodicity for performing the loop tracking is shorter than the first periodicity for performing the search and shorter than the second periodicity for performing the measurement; and
the second periodicity for performing the measurement is shorter than the first periodicity for performing the search;
an intensive measuring mode, wherein in the intensive measurement mode:
the second periodicity for performing the measurement is shorter than the first periodicity for performing the search and shorter than the third periodicity for performing the loop tracking; and
the third periodicity for performing the loop tracking is shorter than the first periodicity for performing the search; and
an intensive searching mode, wherein in the intensive searching mode:
the first periodicity for performing the search is shorter than the second periodicity for performing the measurement and shorter than the third periodicity for performing the loop tracking.

28. The method of claim 18, wherein the determination of the first periodicity, the second periodicity, and the third periodicity is further based on whether connected mode discontinuous reception (CDRX) is configured at the UE.

29. The method of claim 18, wherein the determination of the first periodicity, the second periodicity, and the third period comprises determining synchronization signal burst sets (SSBSs).

30. The method of claim 18, wherein at least one of: performing the search, performing the measurement, or performing the loop tracking is performed using one or more channel state information reference signals (CSI-RSs), one or more tracking reference signals (TRSs), or a combination thereof.

31. The method of claim 18, further comprising:
determining, based on the one or more parameters, a fourth periodicity; and
entering a sleep mode at the determined fourth periodicity.

32. The method of claim 18, performing the loop tracking comprises performing at least one of radio link monitoring (RLM), beam failure detection (BFD), beam failure recovery (BFR), or path loss tracking.

33. The method of claim 18, wherein performing the loop tracking comprises maintaining a frequency tracking loop (FTL), a timing tracking loop (TTL), an automatic gain control (AGC) loop, or a combination thereof.

34. An apparatus for wireless communications, comprising:
a memory comprising instructions; and
at least one processor configured to execute the instructions and cause the apparatus to:
determine, based on one or more parameters:
a first periodicity to perform a search to detect one or more component carriers (CCs), cells, beams, or a combination thereof;
a second periodicity to perform measurement of one or more cells, beams, or both in one more detected CCs; and
a third periodicity to perform loop tracking to monitor a downlink serving quality, an uplink serving beam quality, or both of a cell; and
perform the search at the determined first periodicity, the measurement at the determined second periodicity, and loop tracking at the determined third periodicity, wherein the determination of the first periodicity, the second periodicity, and the third periodicity is further based on:
performing the search having a higher priority than performing the measurement and performing the loop tracking; and
performing the loop tracking having a higher priority than performing the measurement.

35. The apparatus of claim 34, wherein the one or more parameters comprise a signal quality metric related to reception of a reference signal of a serving cell.

36. The apparatus of claim 34, wherein the one or more parameters comprise a number of candidate cells neighboring or potentially neighboring a serving cell that the apparatus is configured to measure.

37. The apparatus of claim 34, wherein the one or more parameters comprise a number of candidate beams that the apparatus is configured to measure.

38. The apparatus of claim 34, wherein the one or more parameters comprises at least one of a frequency tracking loop (FTL) feedback or a timing tracking loop (TTL) feedback.

39. The apparatus of claim 34, wherein the one or more parameters comprise at least one of detection of a beam failure or a radio link monitoring (RLM) status.

40. The apparatus of claim 34, wherein the one or more parameters comprise at least one of an uplink block error rate (BLER) or a downlink BLER.

41. The apparatus of claim 34, wherein the one or more parameters comprise a mobility status of the apparatus, an orientation of the apparatus, or a displacement of the apparatus.

42. The apparatus of claim 34, wherein:
the determining comprises determining that the UE is in one of a plurality of modes; and
each mode has a corresponding first periodicity to perform the search, second periodicity to perform the measurement, and third periodicity to perform the loop tracking.

43. The apparatus of claim 42, wherein the plurality of modes includes two or more of:
a normal mode, wherein in the normal mode:
the second periodicity for performing the measurement and the third periodicity for performing the loop tracking are shorter than the first periodicity for performing the search;
an intensive loop tracking mode, wherein in the intensive loop tracking mode:
the third periodicity for performing the loop tracking is shorter than the first periodicity for performing the search and shorter than the second periodicity for performing the measurement; and
the second periodicity for performing the measurement is shorter than the first periodicity for performing the search;
an intensive measuring mode, wherein in the intensive measurement mode:
the second periodicity for performing the measurement is shorter than the first periodicity for performing the search and shorter than the third periodicity for performing the loop tracking; and
the third periodicity for performing the loop tracking is shorter than the first periodicity for performing the search; and
an intensive searching mode, wherein in the intensive searching mode:
the first periodicity for performing the search is shorter than the second periodicity for performing the measurement and shorter than the third periodicity for performing the loop tracking.

44. The apparatus of claim 34, wherein the determination of the first periodicity, the second periodicity, and the third periodicity is further based on whether connected mode discontinuous reception (CDRX) is configured at the UE.

45. The apparatus of claim 34, wherein the determination of the first periodicity, the second periodicity, and the third period comprises determining synchronization signal burst sets (SSBSs).

46. The apparatus of claim 34, wherein at least one of: performing the search, performing the measurement, or performing the loop tracking is performed using one or more channel state information reference signals (CSI-RSs), one or more tracking reference signals (TRSs), or a combination thereof.

47. The apparatus of claim 34, further comprising:
determining, based on the one or more parameters, a fourth periodicity; and
entering a sleep mode at the determined fourth periodicity.

48. The apparatus of claim 34, performing the loop tracking comprises performing at least one of radio link monitoring (RLM), beam failure detection (BFD), beam failure recovery (BFR), or path loss tracking.

49. The apparatus of claim 34, wherein performing the loop tracking comprises maintaining a frequency tracking loop (FTL), a timing tracking loop (TTL), an automatic gain control (AGC) loop, or a combination thereof.

50. The apparatus of claim 34, further comprising a transceiver via which the search, the measurement and the loop tracking are performed, wherein the apparatus is configured as a user equipment.

* * * * *